United States Patent
Zukerman et al.

(10) Patent No.: US 12,432,252 B2
(45) Date of Patent: Sep. 30, 2025

(54) METHOD AND SYSTEM FOR PREDICTING MALICIOUS ENTITIES

(71) Applicant: MICROSOFT TECHNOLOGY LICENSING, LLC, Redmond, WA (US)

(72) Inventors: Yoni Zukerman, Matan (IL); Hani Hana Neuvirth, Tel-Aviv (IL); Idan Belaiev, Hatzav (IL); Dror Cohen, Tel-Aviv (IL); Miriam Weissler, Kiryat Ye'arim (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

(21) Appl. No.: 18/327,054

(22) Filed: Jun. 1, 2023

(65) Prior Publication Data
US 2024/0406208 A1    Dec. 5, 2024

(51) Int. Cl.
*H04L 9/40* (2022.01)
*G06N 20/00* (2019.01)
*H04L 41/16* (2022.01)

(52) U.S. Cl.
CPC ......... *H04L 63/1441* (2013.01); *G06N 20/00* (2019.01); *H04L 41/16* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 10,129,295 B2 | 11/2018 | Karin et al. | |
| 11,386,343 B2 | 7/2022 | Dodson et al. | |
| 2020/0259852 A1* | 8/2020 | Wolff | G06N 7/01 |
| 2020/0274894 A1* | 8/2020 | Argoeti | H04L 63/1433 |
| 2021/0192057 A1 | 6/2021 | Helfman et al. | |
| 2021/0328969 A1* | 10/2021 | Gaddam | H04L 63/102 |
| 2021/0342441 A1 | 11/2021 | Ross et al. | |
| 2021/0400071 A1 | 12/2021 | Ray | |
| 2022/0327409 A1 | 10/2022 | Dodson et al. | |
| 2023/0134546 A1* | 5/2023 | Gopalakrishnan | G06N 20/20 726/23 |
| 2024/0086569 A1* | 3/2024 | Landy | G06F 21/604 |

OTHER PUBLICATIONS

Gelman, et al., "That Escalated Quickly: An ML Framework for Alert Prioritization", In Repository of arXiv:2302.06648v1, Feb. 13, 2023, 17 Pages.
International Search Report and Written Opinion received for PCT Application No. PCT/US2024/031326, Sep. 10, 2024, 13 pages.

(Continued)

*Primary Examiner* — Shirley X Zhang
(74) *Attorney, Agent, or Firm* — Shook, Hardy & Bacon L.L.P.

(57) ABSTRACT

A computer-implemented method, computer device and computer program are provided for training a Machine Learning model based on a plurality of signal records, each signal record comprising an entity identifier, a signal identifier and a timestamp. Signal records related to an entity can be input into the trained Machine Learning model. The trained Machine Learning model can be used to determine if an entity is malicious.

20 Claims, 5 Drawing Sheets

(56) References Cited

OTHER PUBLICATIONS

"Feature Importance", Retrieved from: https://www.elastic.co/guide/en/machine-learning/current/ml-feature-importance.html, Retrieved Date: Oct. 31, 2022, 3 Pages.

"Predicting classes with classification", Retrieved from: https://www.elastic.co/guide/en/machine-learning/current/ml-dfa-classification.html, Retrieved Date: Oct. 31, 2022, 13 Pages.

"Windows Defender ATP machine learning: Detecting new and unusual breach activity", Retrieved from: https://www.microsoft.com/en-us/security/blog/2017/08/03/windows-defender-atp-machine-learning-detecting-new-and-unusual-breach-activity/, Aug. 3, 2017, 7 Pages.

Crenshaw, et al., "Building a String-Based Machine Learning Model to Detect Malicious Activity", Retrieved from: https://www.crowdstrike.com/blog/detect-malicious-activity-with-string-based-machine-learning-model/, Feb. 11, 2020, 9 Pages.

Fang, Victor, "Malicious PowerShell Detection via Machine Learning", Retrieved from: https://www.mandiant.com/resources/blog/malicious-powershell-detection-via-machine-learning, Jul. 10, 2018, 10 Pages.

Ikwu, Ruth Eneyi, "Predicting the Maliciousness of URLs", Retrieved from: https://towardsdatascience.com/predicting-the-maliciousness-of-urls-24e12067be5, May 7, 2020, 25 Pages.

Marshall, Christopher, "What is named entity recognition (NER) and how can I use it?", Retrieved from: https://medium.com/mysuperai/what-is-named-entity-recognition-ner-and-how-can-i-use-it-2b68cf6f545d, Dec. 18, 2019, 13 Pages.

Quintanilla, "Make predictions with a trained model", Retrieved from: https://learn.microsoft.com/en-us/dotnet/machine-learning/how-to-guides/machine-learning-model-predictions-ml-net, Oct. 12, 2021, 5 Pages.

Raerek, Chelsea, "Predict Malicious Websites: XGBoost", Retrieved from: https://www.kaggle.com/code/craerek/predict-malicious-websites-xgboost, Mar. 15, 2019, 3 Pages.

Rudd, et al., "Training Transformers for Cyber Security Tasks: A Case Study on Malicious URL Prediction", Retrieved from: https://www.mandiant.com/resources/blog/training-transformers-for-cyber-security-tasks-malicious-url-prediction, Jan. 21, 2021, 10 Pages.

Wasike, Bravin, "Detecting Malicious URL using Machine Learning", Retrieved from: https://www.section.io/engineering-education/detecting-malicious-url-using-machine-learning/, Jan. 20, 2022, 18 Pages.

Wejinya, et al., "Machine Learning for Malicious URL Detection", In Journal of Advances in Intelligent Systems and Computing, vol. 1270, Dec. 15, 2020, pp. pp. 463-472.

* cited by examiner

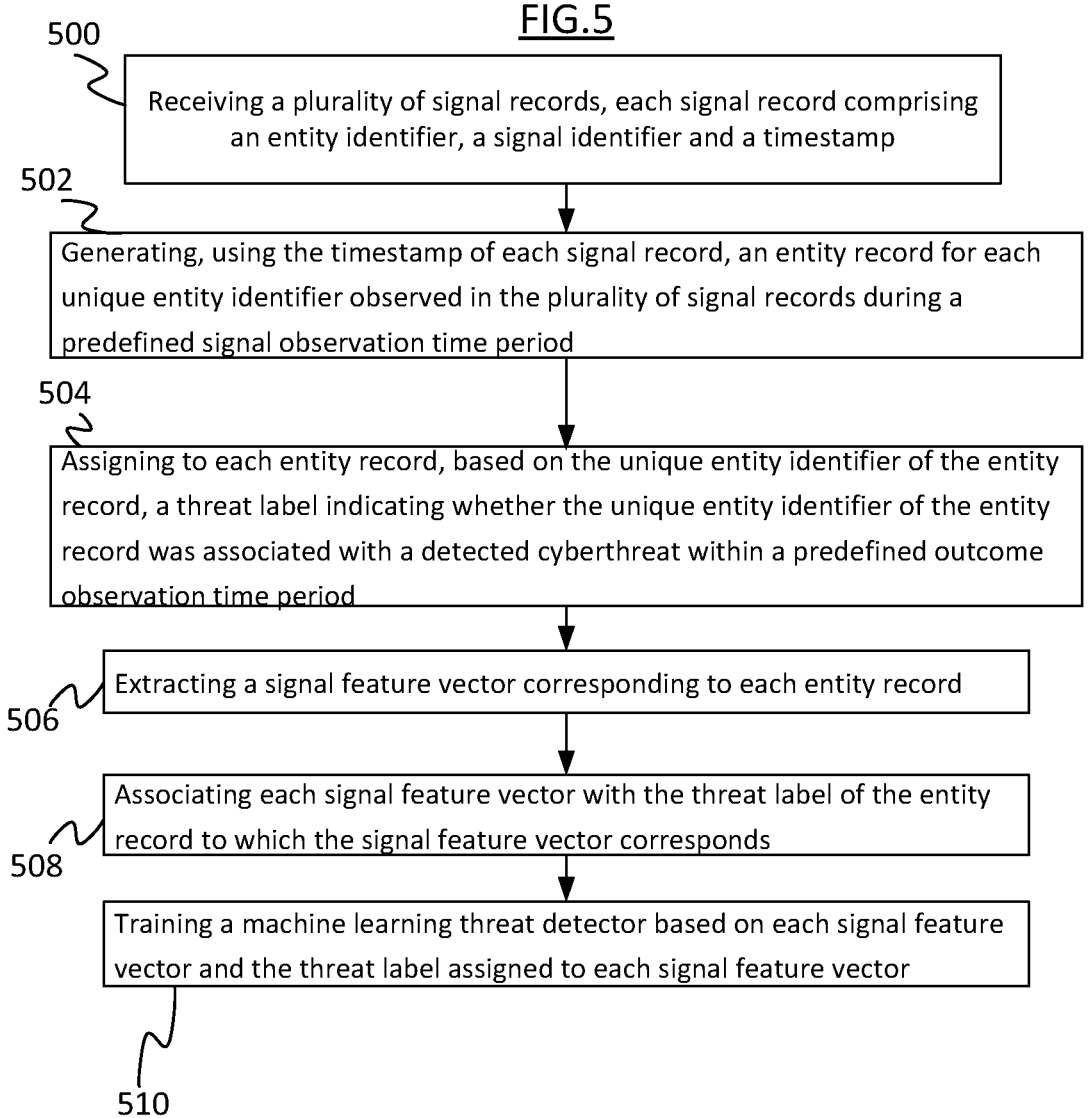

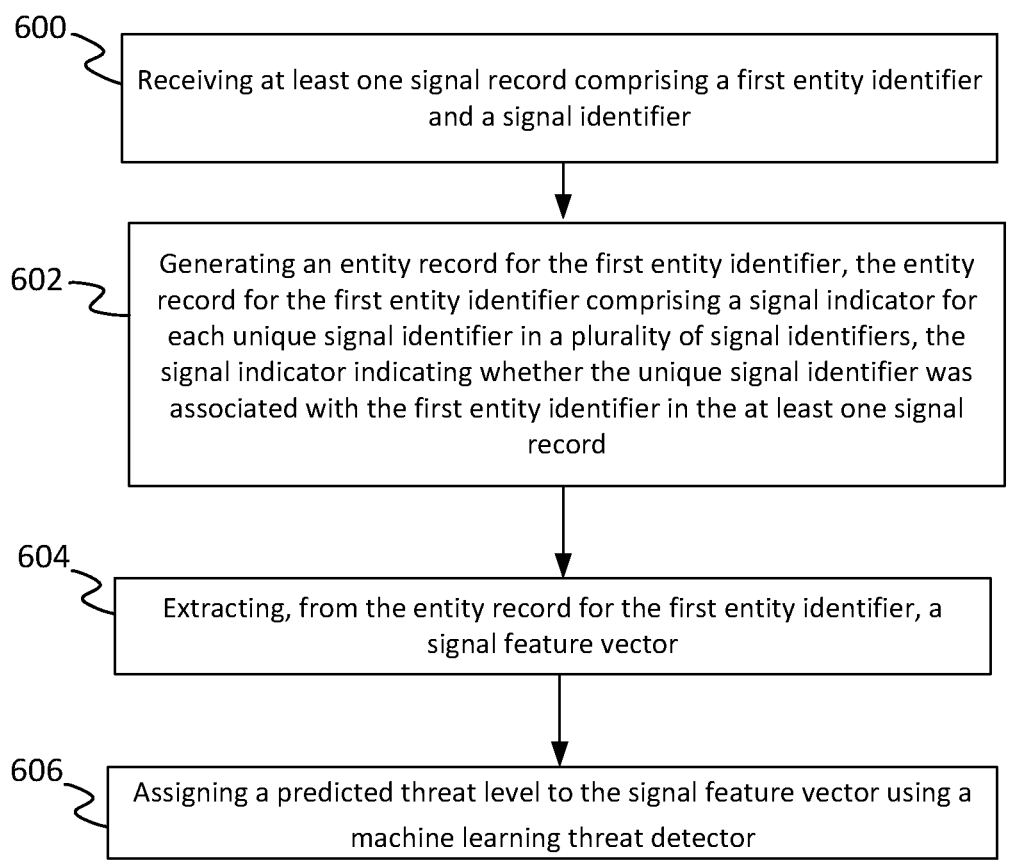

METHOD AND SYSTEM FOR PREDICTING MALICIOUS ENTITIES

TECHNICAL FIELD

The present disclosure relates to cybersecurity, and in particular to methods and systems for predicting whether an entity is malicious.

BACKGROUND

Security Operations Center (SOC) analysts deal with a large number of threats daily, which often results in alert fatigue. Traditional detections of security incidents and anomalies give SOC analysts a sense of which suspicious activities are taking place, but do not indicate which are the main entities likely to be at risk or likely to pose a risk to other users.

SUMMARY

According to an aspect disclosed herein, there is provided a method and system for training a machine learning (ML) threat detector based on signal records. The trained ML threat detector can be used to predict a threat level of an entity. A cybersecurity mitigation action can be performed based on the predicted threat level.

According to a second aspect disclosed herein, there is provided a method and system for predicting a threat level of an entity. A cybersecurity mitigation action can be performed based on the predicted threat level.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all the disadvantages noted herein.

BRIEF DESCRIPTION OF THE DRAWINGS

To assist understanding of the present disclosure and to show how embodiments may be put into effect, reference is made by way of example to the accompanying drawings in which:

FIG. 5 shows an example method flow; and

FIG. 6 shows an example method flow.

DETAILED DESCRIPTION

Figure 1:
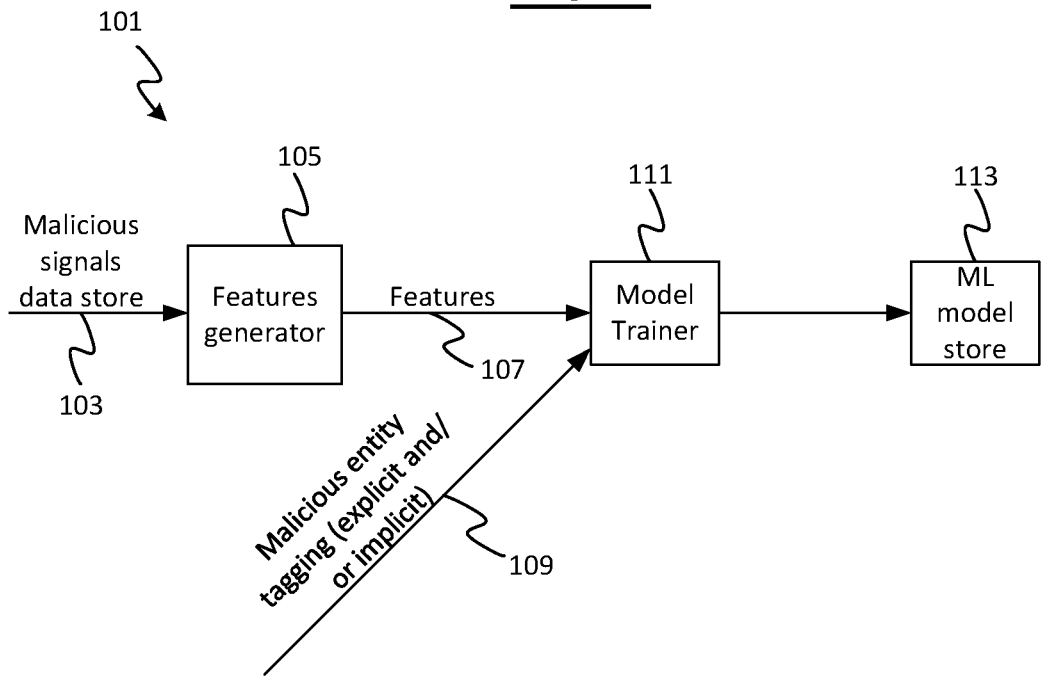
FIG. 1 is a schematic representation of a training pipeline.

The described embodiments implement cybersecurity threat detection and mitigation by predicting which entities in a domain are involved in malicious activities.

Systems and methods incorporating the aforementioned approach are described below.

The described methodology trains a ML threat detector using a plurality of signals. A signal may be considered to comprise at least one of: a detection; an alert; an incident; an anomaly. In some examples, each signal is measured within a system comprising a plurality of entities. After training, further measured signals can be input into the ML threat detector to predict which entities are likely to be involved in malicious activities. An entity may comprise: a user; a device; an IP address; an organization; etc.

In some examples, a probability that an entity is involved in a malicious activity is provided as output from the trained ML model.

By detecting entities that are likely to be involved in malicious activities, the most imminent threats can be tackled using cybersecurity mitigation actions first before any severe damage is done. If a particular entity within a group of entities is required to be kept more secure than other entities in the group, for example if the particular entity holds sensitive information, when a prediction is made that the particular entity as well at least one of the other entities is likely to be involved in malicious activities, cybersecurity mitigation action(s) for the particular entity can be prioritized above cybersecurity mitigation action(s) for other entities in the group. Knowledge of which entities are likely to be involved in malicious activities can therefore be used to increase security. Further, knowledge of which entities are likely to be involved in malicious activities can be used to target the entities that are likely to be involved in malicious activities, without having to perform a cybersecurity mitigation action for entities that are not likely to be involved in malicious activities. This saves processing resources and reduces disruption by only performing cybersecurity mitigation actions for relevant entities.

A cybersecurity mitigation action may include at least one of the following: preventing an entity from sending data to other entities; preventing an entity from receiving data from other entities; preventing the entity from publishing applications; preventing the entity from downloading further data; issuing a warning notification indicating that the entity is malicious to devices known to have interacted with the entity; blacklisting the entity; investigating the entity.

Neural networks and other ML models are used in the field of ML and artificial intelligence (AI). A neural network comprises a plurality of nodes which are interconnected by links, sometimes referred to as edges. The input edges of one or more nodes form the input of the network as a whole, and the output edges of one or more other nodes form the output of the network, whilst the output edges of various nodes within the network form the input edges to other nodes. Each node represents a function of its input edge(s) weighted by a respective weight; the result being output on its output edge(s). The weights can be gradually tuned based on a set of experience data (e.g., training data) to tend towards a state where the output of the network will output a desired value for a given input. Training can be performed using a number of different algorithms including, for example, a gradient descent algorithm.

Some examples as described herein provide a ML threat detector that is capable of predicting entities that are involved in malicious activity. This prediction can be used to perform cybersecurity mitigation actions.

FIG. 1 shows a method for training a ML threat detector. Broadly, there are three stages shown in FIG. 1. Firstly, for each entity in a plurality of malicious signals received from a malicious signals data store 103, involvement in various malicious indicators is summarized. Features 107 are then generated based on these indicators. Secondly, tagging information 109 is used to combine implicit and explicit indication of attacks that the entities are involved in, if any. Tagging information 109 is combined with feature information 107. Thirdly, an ML model is trained using the combined feature and tagging information. The trained ML model can be stored in ML model store 113. These three stages are now discussed in detail below.

At 103 information from a malicious signals data store is input into features generator 105. The information comprises a plurality of signal records. Each signal record describes a recorded signal. Each signal record comprises an entity identifier, a signal identifier and a timestamp. The entity identifier identifies which entity the signal was associated with. The signal identifier identifies the type of signal. The timestamp indicates the time (or time range) when the signal was recorded or measured. An example of a plurality of signal records is shown in Table 1, where for each signal record: the entity identifier comprises "UserID", the signal identifier comprises "Signal Name" and the timestamp comprises "TimeGenerated". Severity and Additional Information is also included in Table 1, but it should be noted that in some examples this information is not included for each signal record.

TABLE 1

Example signal records that may be received from e.g., malicious signals data store 103.

| UserId | Signal Name | TimeGenerated | Severity | Additional Information |
|---|---|---|---|---|
| A32-BF3 | Brute force attempt | 7 Feb. 2023 14:00 | LOW | N/A |
| A11-BF4 | Abnormal rate of activities | 7 Feb. 2023 14:10 | LOW | N/A |
| A32-BF3 | Mass Download | 4 Feb. 2023 14:15 | MEDIUM | N/A |
| A11-BF89 | Brute force attempt | 29 Jan. 2023 19:10 | LOW | N/A |

The plurality of signal records may include malicious signals observed within a system over a particular time period. As an illustrative example, the plurality of signal records may comprise all malicious signals observed in system over the past 14 days.

Features generator 105 creates an entity record for each unique entity identifier observed in the plurality of signal records during a predefined signal observation time period (a time window). Each entity record comprises the unique entity identifier of the entity and a signal indicator for each unique signal identifier observed in the plurality of signal records during the predefined signal observation time period, the signal indicator indicating whether the unique signal identifier was associated with the unique entity identifier in the predefined signal observation time period. The results in at least one entity record. Each entity record may have its own predefined signal observation time period. In some examples, two or more entity records may have the same predefined signal observation time period. Continuing with the example shown in Table 1 provides the entity records shown in Table 2.

TABLE 2

Entity records determined by features generator 105 based on the example signal records of Table 1.

| UserId | Brute force attempt | Abnormal rate of activities | Mass Download | Time window ended |
|---|---|---|---|---|
| A32-BF3 | 1 | 0 | 1 | 7 Feb. 2023 15:00 |
| A11-BF4 | 0 | 1 | 0 | 7 Feb. 2023 15:00 |
| A11-BF89 | 1 | 0 | 0 | 30 Jan. 2023 19:00 |

As a signal indicator is generated for each unique signal identifier observed in the plurality of signal records during the predefined signal observation time period, if there are N different types of signal in the "Signal Name" column of Table 1, there will be N columns in Table 2 between the "UserID" and "Time Window ended" column.

In some examples, each signal indicator indicates only if the unique signal identifier was associated with the unique entity identifier in the predefined signal observation time period. In other examples, the signal indicator may indicate a frequency of occurrence (e.g., a number of occurrences) with which the unique signal identifier was associated with the unique entity identifier in the predefined signal observation time period. As an example, a signal indicator for a particular entity may indicated that the entity was associated with x Brute Force attempts, y abnormal rates of activity and z mass downloads during the predefined signal observation time period, where x, y and z are integers.

The entity records 107 generated by features generator 105 are sent to model trainer 111. Model trainer 111 additionally receives tagging information 109 comprising threat labels for different entities. Each label indicates an entity identifier and whether the entity was labelled as malicious ("True" in Table 3) or not malicious ("False" in Table 3). Malicious labels may indicate that a user was associated or determined as being associated with a detected cyberthreat.

The tagging information may include at least one of:
At least one implicit label—an implicit label can be determined when an entity is involved in an incident tagged as malicious, such that the entity can be inferred to be malicious at the time the incident was created;
At least one explicit label—can be determined when a customer/user tags an entity as malicious at a given time point.

According to some examples, only tagging information received from trusted entities (e.g., trusted tenants) is used at 109.

Table 3 shows an example of tagging information. Each threat label has a predefined outcome observation time period (shown in Table 3 as "Label generation time".

TABLE 3

Tagging information for the three entities of Tables 1 and 2.

| UserId | Label | Label generation time |
|---|---|---|
| A32-BF3 | False | 7 Feb. 2023 16:00 |
| A11-BF4 | False | 7 Feb. 2023 19:00 |
| A11-BF89 | True | 30 Jan. 2023 20:00 |

The tagging information 109 may be associated with the plurality of entity records 107. The logic for this association may be as follows:
If an entity in the entity records table (e.g., Table 2) has a label in the labels table (e.g., Table 3), and the label was generated after the time the entity record was generated, the label is added to the entity records table for matching entity identifiers. As seen in the labels table (e.g., Table 3), the label can either be true or false (malicious or non-malicious).
If an entity in the features table (e.g., Table 2) does not have a label in the labels table (e.g., Table 3), label the entity records for the entity identifier are labelled as False (as there is no indication that the entity is malicious, the entity is considered as not malicious).

Based on the examples of Tables 2 and 3 and using the above-described logic, assigning to each entity record a label would provide the plurality of entity records with threat labels as shown in Table 4.

TABLE 4

Entity records associated with threat labels, using the examples of Tables 1 to 3.

| UserId | Brute force attempt | Abnormal rate of activities | Mass Download | Time window ended | Label |
|---|---|---|---|---|---|
| A32-BF3 | 1 | 0 | 1 | 7 Feb. 2023 15:00 | False |
| A11-BF4 | 0 | 1 | 0 | 7 Feb. 2023 15:00 | False |
| A11-BF89 | 1 | 0 | 0 | 30 Jan. 2023 19:00 | True |

At 111, the predefined signal observation period and entity identifier information is removed to extract a signal feature vector for each label entity record, the signal feature vector comprising a signal indicator for each unique signal identifier observed in the plurality of signal records during the predefined signal observation time period. Each signal feature vector has an associated a threat label. For example, the first row of Table 4 would provide the signal feature vector (1, 0, 1) and a threat label "False". Using the feature vector and threat label pairs, a machine learning threat detector 111 can be trained using supervised learning techniques.

According to some examples, the ML model is a classifier for classifying a feature vector to a correct label. According to some examples, the ML model outputs a probability that an entity is involved in malicious activity based on a feature vector for the entity.

ML model may comprise multiple decision trees to determine probability than an entity is associated with malicious activity. The ML model may comprise an Extreme Gradient Boosting (XGB) classifier. When the ML model is trained, it may be saved in ML model store 113 to use for predictions, as discussed below with respect to FIG. 2.

Re-training may occur by repeating the training pipeline shown in FIG. 1 at a later time, using a different plurality of signal records at 103 recorded during a different time period to the first plurality of data signal records. As the plurality of signal records will be different in the different time period, some of the types of signal triggered will likely be different. In other words, there will likely be a different set of unique signal identifiers observed for each different plurality of signal records. This means that the feature space will be different for a first ML model and a second ML model trained using a different plurality of signal records. By performing re-training and having a feature space that dynamically changes based on the types of signals measured in the real-world, a method is provided that can use ML models that are adapted to the most up to date signals observed "in the wild". This provides a method that is well adapted to spotting cyberthreats and patterns of attack that change over time. The feature space used for each ML model can dynamically change itself between each trained ML model to adjust to new patterns of attack. Further, by only using relevant unique signal identifiers during each training phase, training time for each ML model can be reduced.

The method of training described above provides a generic model that can be used to predict threat labels for entities not observed in the training data (as well as entities observed in the training data). Some examples provide an ML model that is trained on multiple attack patterns from multiple entities.

According to some examples, labelling information 111 may comprise ensemble labelling. Ensemble labelling may comprise a data combined from both implicit and explicit labelling sources.

Figure 2:
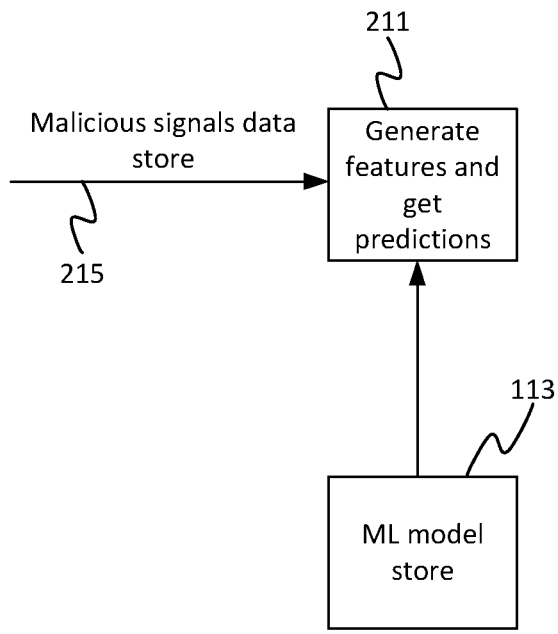
FIG. 2 is a schematic representation of a prediction pipeline.

FIG. 2 shows an example method for predicting of an entity being involved in malicious activity. In this example, the prediction is made for a particular entity identified in at least one signal record, referred to as the "first entity". At 215, the at least one signal record comprising an entity identifier of the first entity and a signal identifier is received from a malicious data store. A feature vector for each entity that predictions are desired for is then predicted. The feature vector may be determined based on at least one signal record(s) for a particular entity in a particular time period. For example, the feature vector may be determined for the entity over the previous 2 days.

A trained ML model is loaded from ML model store 113. The trained ML model may comprise a model trained as described above. An entity record may be generated for the first entity. The entity record for the first entity identifier comprises a signal indicator for each unique signal identifier that the trained ML model has in its feature space, the signal indicator indicating whether the unique signal identifier was associated with the first entity identifier in the at least one signal record. As an example, if an ML model was trained using the information in Table 4 above, the entity record for the first entity identifier would have a signal indicator for each of "Brute force attempt", "Abnormal rate of activities", "Mass download". The signal indicator may indicate if the first entity was associated with each of the different types of signal. The signal indicator may indicate how many times the first entity was associated with the different type of signal. The entity record can then be input into the trained ML model to assign a threat level to the first entity. The threat level predicts if the entity will be involved in malicious activity in the near future, based on the recorded signals for the entity over a recent time period. A recently trained ML model can be used from ML model store 113 such that the ML model has been trained in a feature space that is up to date with recent attack patterns observed in the system. The predicted threat level may comprise at least one of: a category; a score. A threat level category for an entity may comprise categories indicating how likely it is that the entity will be involved in malicious activity (e.g., "very likely", "likely", "not likely", "very unlikely"). A threat level score may comprise a probability that the entity will be involved in malicious activity.

Based on the assigned threat level, a cybersecurity mitigation action can be performed. According to some examples, stronger cybersecurity mitigation actions are performed for higher threat levels.

Examples described herein provide a method for providing an ML model that can updated with a new ML model, which can also be replaced by a newer ML model and so on. Each new ML model is trained in a feature space of recently observed types of signal. As such, each ML model is adjusted to attack patterns seen in practice. This is particularly useful in the field of cybersecurity, where malicious campaigners regularly create new attacks to work-around security systems.

Figure 3:
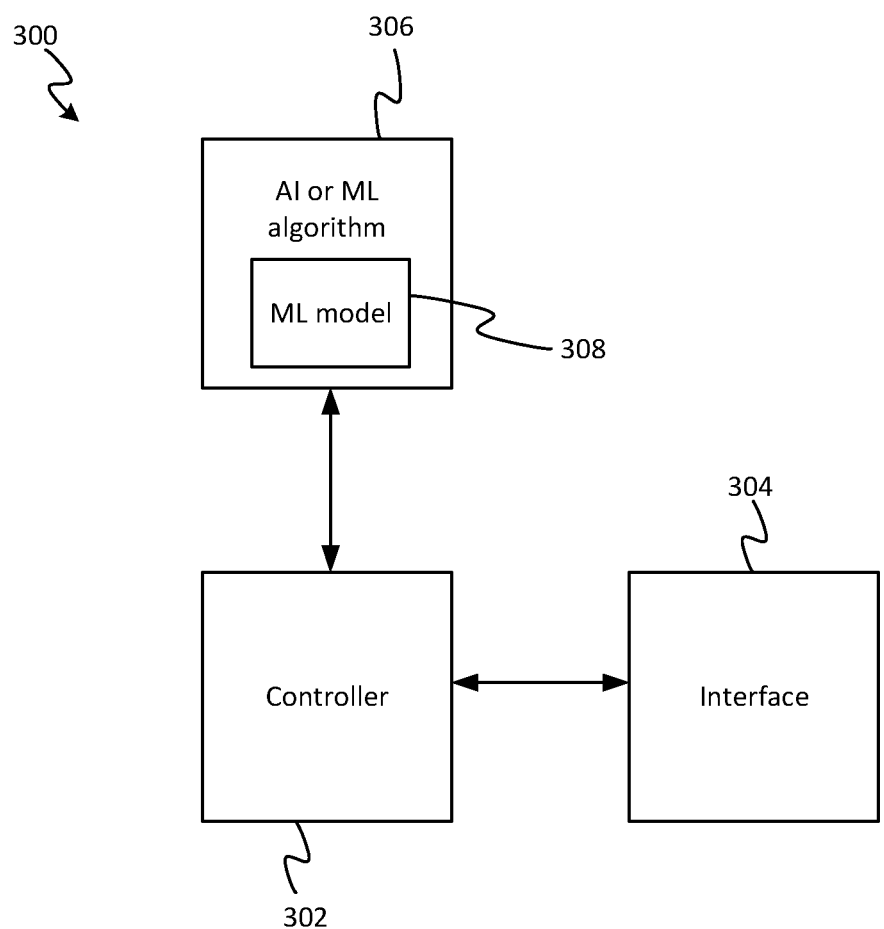
FIG. 3 is a schematic illustration of a computing apparatus for implementing a neural network.

FIG. 3 illustrates an example computing apparatus 300 for implementing an artificial intelligence (AI) algorithm including a machine-learning model in accordance with embodiments described herein. The computing apparatus 300 may take the form of a user terminal such as a desktop computer, laptop computer, tablet, smartphone, wearable smart device such as a smart watch, an on-board computer of a vehicle such as car, or a managing computing system for a set of sensors etc. Additionally, or alternatively, the computing apparatus 300 may comprise a server. A server herein refers to a logical entity which may comprise one or more physical server units located at one or more geographic sites. Where required, distributed or "cloud" computing techniques are in themselves known in the art. The one or more user terminals and/or the one or more server units of the server may be connected to one another via a packet-switched network, which may comprise for example a wide-area internetwork such as the Internet, a mobile cellular network such as a 3GPP network, a wired local area network (LAN) such as an Ethernet network, or a wireless LAN such as a Wi-Fi, Thread or 6LoWPAN network.

The computing apparatus 300 comprises at least a controller 302, an interface (e.g., a user interface) 304, and an artificial intelligence (AI) algorithm 306. The controller 302 is operatively coupled to each of the interface 304 and the AI algorithm 306.

Each of the controller 302, interface 304 and AI algorithm 306 may be implemented in the form of software code embodied on computer readable storage and run on processing apparatus comprising one or more processors such as CPUs, work accelerator co-processors such as GPUs, and/or other application specific processors, implemented on one or more computer terminals or units at one or more geographic sites. The storage on which the code is stored may comprise one or more memory devices employing one or more memory media (e.g., electronic or magnetic media), again implemented on one or more computer terminals or units at one or more geographic sites. In embodiments, one, some or all the controller 302, interface 304 and AI algorithm 306 may be implemented on the server. Alternatively, a respective instance of one, some or all of these components may be implemented in part or even wholly on each of one, some or all of the one or more user terminals. In further examples, the functionality of the above-mentioned components may be split between any combination of the user terminals and the server. Again, it is noted that, where required, distributed computing techniques are in themselves known in the art. It is also not excluded that one or more of these components may be implemented in dedicated hardware.

The controller 302 comprises a control function for coordinating the functionality of the interface 304 and the AI algorithm 306. The interface 304 refers to the functionality for receiving and/or outputting data. The interface 304 may comprise a user interface (UI) for receiving and/or outputting data to and/or from one or more users, respectively; or it may comprise an interface to a UI on another, external device. Alternatively, the interface may be arranged to collect data from and/or output data to an automated function implemented on the same apparatus or an external device. In the case of an external device, the interface 304 may comprise a wired or wireless interface for communicating via a wired or wireless connection respectively, with the external device. The interface 304 may comprise one or more constituent types of interface, such as voice interface, and/or a graphical user interface. The interface 304 may present a UI front end to the user(s) through one or more I/O modules on their respective user device(s), e.g., speaker and microphone, touch screen, etc., depending on the type of user interface. The logic of the interface may be implemented on a server and output to the user through the I/O module(s) on his/her user device(s). Alternatively, some or all the logic of the interface 304 may also be implemented on the user device(s) 302 its/themselves.

The controller 302 is configured to control the AI algorithm 306 to perform operations in accordance with the embodiments described herein. It will be understood that any of the operations disclosed herein may be performed by the AI algorithm 306, under control of the controller 302 to collect experience data from the user and/or an automated process via the interface 304, pass it to the AI algorithm 306, receive predictions back from the AI algorithm and output the predictions to the user and/or automated process through the interface 304.

The AI algorithm 306 comprises a machine-learning model 308, comprising one or more constituent statistical models such as one or more neural networks.

Figure 4:
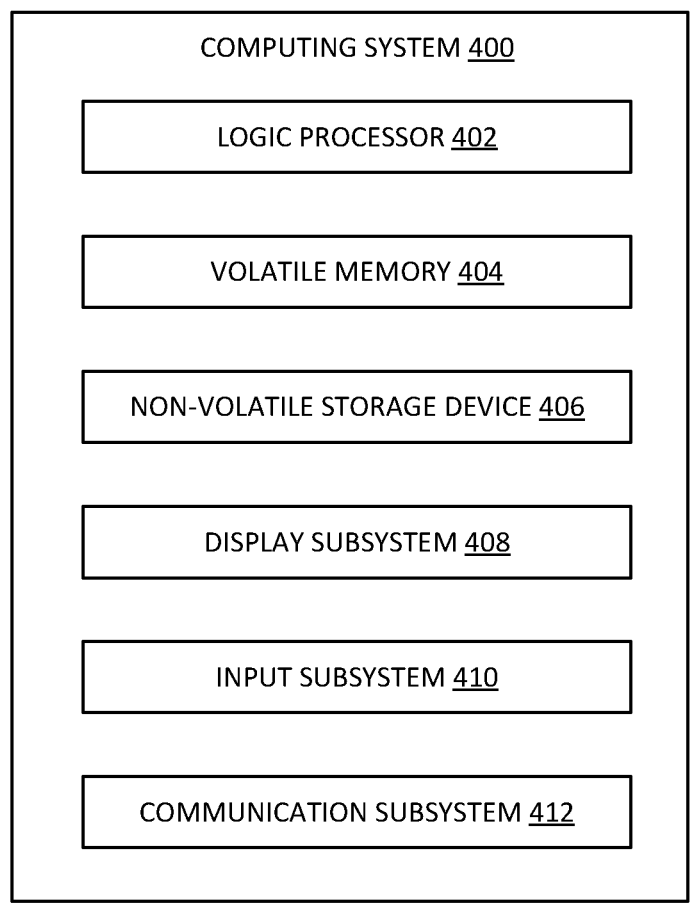
FIG. 4 shows an example apparatus.

FIG. 4 schematically shows a non-limiting example of a computing system 400, such as a computing device or system of connected computing devices, that can enact one or more of the methods or processes described above. Computing system 400 is shown in simplified form. Computing system 400 includes a logic processor 402, volatile memory 404, and a non-volatile storage device 406. Computing system 400 may optionally include a display subsystem 408, input subsystem 410, communication subsystem 412, and/or other components not shown in FIG. 4. Logic processor 402 comprises one or more physical (hardware) processors configured to carry out processing operations. For example, the logic processor 402 may be configured to execute instructions that are part of one or more applications, programs, routines, libraries, objects, components, data structures, or other logical constructs. The logic processor 402 may include one or more hardware processors configured to execute software instructions based on an instruction set architecture, such as a central processing unit (CPU), graphical processing unit (GPU) or other form of accelerator processor. Additionally or alternatively, the logic processor 402 may include a hardware processor(s)) in the form of a logic circuit or firmware device configured to execute hardware-implemented logic (programmable or non-programmable) or firmware instructions. Processor(s) of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 402 may be virtualized and executed by remotely accessible, networked computing devices configured in a cloud-computing configuration. In such a case, these virtualized aspects are run on different physical logic processors of various different machines. Non-volatile storage device 406 includes one or more physical devices configured to hold instructions executable by the logic processor 402 to implement the methods and processes described herein. When such methods and processes are implemented, the state of non-volatile storage device 406 may be transformed—e.g., to hold different data. Non-volatile storage device 406 may include physical devices that are removable and/or built-in. Non-volatile storage device 406 may include optical memory (e g., CD, DVD, HD-DVD, Blu-Ray Disc, etc.), semiconductor memory (e g., ROM, EPROM, EEPROM, FLASH memory, etc.), and/or magnetic memory (e.g., hard-disk drive), or other mass storage device technology. Non-volatile storage device 406 may include nonvolatile, dynamic, static, read/write, read-only, sequential-access, location-addressable, file-addressable, and/or content-addressable devices. Volatile memory 404 may include one or more physical devices that include random access memory. Volatile memory 404 is typically utilized by logic processor 402 to temporarily store information during processing of software instructions. Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. Different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices. When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor. When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the internet. The term computer readable media as used herein may include computer storage media. Computer storage media may include volatile and non-volatile, removable and nonremovable media (e.g., volatile memory 404 or non-volatile storage 406) implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g. the computing system 400 or a component device thereof). Computer storage media does not include a carrier wave or other propagated or modulated data signal. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct wired connection, and wireless media such as acoustic, radio frequency (RF), infrared, and other wireless media.

FIG. 5 shows an example method flow for training a machine learning threat detector. At 500, the method comprises receiving plurality of signal records. Each signal record comprising an entity identifier, a signal identifier and a timestamp.

At 502, the method comprises generating, using the timestamp of each signal record, an entity record for each unique entity identifier observed in the plurality of signal records during a predefined signal observation time period. The entity record for each unique entity identifier comprises the unique entity identifier and a signal indicator for each unique signal identifier observed in the plurality of signal records during the predefined signal observation time period, the signal indicator indicating whether the unique signal identifier was associated with the unique entity identifier in the predefined signal observation time period.

At 504, the method comprises assigning to each entity record, based on the unique entity identifier of the entity record, a threat label indicating whether the unique entity identifier of the entity record was associated with a detected cyberthreat within a predefined outcome observation time period.

At 506, the method comprises extracting a signal feature vector corresponding to each entity record. Each signal feature vector may be extracted from an entity record.

At 508, the method comprises associating each signal feature vector with the threat label of the entity record to which the signal feature vector corresponds.

At 510, the method comprises training a machine learning threat detector based on each signal feature vector and the threat label assigned to each signal feature vector. In some examples, the machine learning threat detector can be used to detect malicious entities. In some embodiments of step 510, a machine learning model is trained based on each signal feature vector and the threat label assigned to each signal feature vector thereby generating the machine learning threat detector.

FIG. 6 shows an example method flow for predicting a threat level for an entity. At 600, the method comprises receiving at least one signal record comprising a first entity identifier and a signal identifier.

At 602, the method comprises generating an entity record for the first entity identifier, the entity record for the first entity identifier comprising a signal indicator for each unique signal identifier in a plurality of signal identifiers, the signal indicator indicating whether the unique signal identifier was associated with the first entity identifier in the at least one signal record.

At 604, from the entity record of 602, a signal feature vector is extracted. At 606, the signal feature vector may be input into a machine learning threat detector to assign a predicted threat level. In some examples, a cybersecurity mitigation action can be performed based on the predicted threat level.

According to an aspect, there is provided a computer-implemented method comprising: computer-implemented method comprising: receiving a plurality of signal records, each signal record comprising an entity identifier, a signal identifier and a timestamp; generating, using the timestamp of each signal record, an entity record for each unique entity identifier observed in the plurality of signal records during a predefined signal observation time period, the entity record comprising: the unique entity identifier, and a signal indicator for each unique signal identifier observed in the plurality of signal records during the predefined signal observation time period, the signal indicator indicating whether the unique signal identifier was associated with the unique entity identifier in the predefined signal observation time period; assigning to each entity record, based on the unique entity identifier of the entity record, a threat label indicating whether the unique entity identifier of the entity record was associated with a detected cyberthreat within a predefined outcome observation time period; extracting a signal feature vector corresponding to each entity record; associating each signal feature vector with the threat label of the entity record to which the signal feature vector corresponds; and training a machine learning threat detector based on each signal feature vector and the threat label assigned to each signal feature vector. In some examples, the training a machine learning threat detector utilizes a machine learning model that is trained based on each signal feature vector and the threat label assigned to each signal feature vector. Accordingly, the machine learning threat detector is generated by training the machine learning model.

According to some examples, the method comprises: receiving an unlabelled signal feature vector; assigning a predicted threat level to the unlabelled signal feature vector using the machine learning threat detector; performing a cybersecurity mitigation action based on the predicted threat level.

According to some examples, the unlabelled signal feature vector comprises an entity identifier, and wherein the predicted threat level comprises a probability that an entity identified by the entity identifier is malicious.

According to some examples, the unlabelled signal feature vector is for a first entity, and wherein the method comprises: receiving at least one signal record for the first entity, each of the at least one signal record for the first entity comprising a signal identifier; determining, for the first entity, an entity record comprising a signal indicator for each unique signal identifier observed in the plurality of signal records during the predefined signal observation time period, the signal indicator indicating whether the unique signal identifier was associated with the first entity in the at least one signal record for the first entity; determining the unlabelled signal feature vector using the entity record for the first entity.

According to some examples, the machine learning threat detector comprises a tree-based classifier.

According to some examples, the method comprises receiving a second plurality of signal records, each signal record comprising an entity identifier, a signal identifier and a timestamp; generating, using the timestamp of each signal record of the second plurality of signal records, an entity record for each unique entity identifier observed in the second plurality of signal records during a second predefined signal observation time period, the entity record comprising: the unique entity identifier, and a signal indicator for each unique signal identifier observed in the second plurality of signal records during the second predefined signal observation time period, the signal indicator indicating whether the unique signal identifier was associated with the unique entity identifier in the predefined signal observation time period; assigning to each entity record for the second plurality of records, based on the unique entity identifier of the entity record, a threat label indicating whether the unique entity identifier of the entity record was associated with a detected cyberthreat within a second predefined outcome observation time period; extracting a signal feature vector corresponding to each entity record for the second plurality of records; associating each signal feature vector with the threat label of the entity record to which the signal feature vector corresponds; and training a second machine learning threat detector based on each signal feature vector for the second plurality of records and the threat label assigned to each signal feature vector for the second plurality of records.

According to some examples, a first threat label of the threat label for the entity record for each unique entity identifier comprises an explicit label provided by a user, and wherein a second threat label of the threat label for the entity record for each unique entity identifier comprises an implicit label determined by an entity being involved in a malicious incident.

According to some examples, the signal indicator indicating whether the unique signal identifier was associated with the unique entity identifier in the predefined signal observation time period comprises an indication of a frequency of occurrence of association between the unique signal identifier and the unique entity identifier in the predefined signal observation time period.

According to an aspect there is provided a computer device comprising: a processing unit; a memory coupled to the processing unit and configured to store executable instructions which, upon execution by the processing unit, are configured to cause the processing unit to: receive a plurality of signal records, each signal record comprising an entity identifier, a signal identifier and a timestamp; generate, using the timestamp of each signal record, an entity record for each unique entity identifier observed in the plurality of signal records during a predefined signal observation time period, the entity record comprising: the unique entity identifier, and a signal indicator for each unique signal identifier observed in the plurality of signal records during the predefined signal observation time period, the signal indicator indicating whether the unique signal identifier was associated with the unique entity identifier in the predefined signal observation time period; assign to each entity record, based on the unique entity identifier of the entity record, a threat label indicating whether the unique entity identifier of the entity record was associated with a detected cyberthreat within a predefined outcome observation time period; extract a signal feature vector corresponding to each entity record; associate each signal feature vector with the threat label of the entity record to which the signal feature vector corresponds; and train a machine learning threat detector based on each signal feature vector and the threat label assigned to each signal feature vector. In some examples, a machine learning threat detector is generated by training a machine learning model based on each signal feature vector and the threat label assigned to each signal feature vector, and configuring the machine learning threat detector to use the machine learning model.

According to some examples the executable instructions, upon execution by the processing unit, are configured to cause the processing unit to: receive an unlabelled signal feature vector; assign a predicted threat level to the unlabelled signal feature vector using the machine learning threat detector; perform a cybersecurity mitigation action based on the predicted threat level.

According to some examples, the unlabelled signal feature vector comprises an entity identifier, and wherein the predicted threat level comprises a probability that an entity identified by the entity identifier is malicious.

According to some examples, the machine learning threat detector comprises a tree-based classifier.

According to an aspect, there is provided a computer-readable storage device comprising instructions executable by a processor for: receiving a plurality of signal records, each signal record comprising an entity identifier, a signal identifier and a timestamp; generating, using the timestamp of each signal record, an entity record for each unique entity identifier observed in the plurality of signal records during a predefined signal observation time period, the entity record comprising: the unique entity identifier, and a signal indicator for each unique signal identifier observed in the plurality of signal records during the predefined signal observation time period, the signal indicator indicating whether the unique signal identifier was associated with the unique entity identifier in the predefined signal observation time period; assigning to each entity record, based on the unique entity identifier of the entity record, a threat label indicating whether the unique entity identifier of the entity record was associated with a detected cyberthreat within a predefined outcome observation time period; extracting a signal feature vector corresponding to each entity record; associating each signal feature vector with the threat label of the entity record to which the signal feature vector corresponds; and training a machine learning threat detector based on each signal feature vector and the threat label assigned to each signal feature vector. In some examples, a machine learning threat detector is generated by training a machine learning model based on each signal feature vector and the threat label assigned to each signal feature vector, and configuring the machine learning threat detector to use the machine learning model.

According to an aspect there is provided a computer-implemented method comprising: receiving at least one signal record comprising a first entity identifier and a signal identifier; generating an entity record for the first entity identifier, the entity record for the first entity identifier comprising a signal indicator for each unique signal identifier in a plurality of signal identifiers, the signal indicator indicating whether the unique signal identifier was associated with the first entity identifier in the at least one signal record; extracting, from the entity record for the first entity identifier, a signal feature vector; assigning a predicted threat level to the signal feature vector using a machine learning threat detector.

According to some examples, the method comprises performing a cybersecurity mitigation action based on the predicted threat level.

According to some examples, the method comprises: receiving a plurality of signal records comprising the at least one signal record, each signal record of the plurality of signal records comprising an entity identifier, a signal identifier and a timestamp;

generating, using the timestamp of each signal record, an entity record for each unique entity identifier observed in the plurality of signal records during a predefined signal observation time period, the entity record comprising: the unique entity identifier, and a signal indicator for each unique signal identifier observed in the plurality of signal records during the predefined signal observation time period, the signal indicator indicating whether the unique signal identifier was associated with the unique entity identifier in the predefined signal observation time period; assigning to each entity record, based on the unique entity identifier of the entity record, a threat label indicating whether the unique entity identifier of the entity record was associated with a detected cyberthreat within a predefined outcome observation time period; extracting a signal feature vector corresponding to each entity record; associating each signal feature vector with the threat label of the entity record to which the signal feature vector corresponds; and training a second machine learning threat detector based on each signal feature vector and the threat label assigned to each signal feature vector. In some examples, a machine learning threat detector is generated by training a machine learning model based on each signal feature vector and the threat label assigned to each signal feature vector, and configuring the machine learning threat detector to use the machine learning model.

According to some examples, the machine learning threat detector comprises a tree-based classifier and the second machine learning threat detector comprises a tree-based classifier.

According to an aspect, there is provided a computer device comprising: a processing unit; a memory coupled to the processing unit and configured to store executable instructions which, upon execution by the processing unit, are configured to cause the processing unit to: receive at least one signal record comprising a first entity identifier and a signal identifier; generate an entity record for the first entity identifier, the entity record for the first entity identifier comprising a signal indicator for each unique signal identifier in a plurality of signal identifiers, the signal indicator indicating whether the unique signal identifier was associated with the first entity identifier in the at least one signal record; extract, from the entity record for the first entity identifier, a signal feature vector; assign a predicted threat level to the signal feature vector using a machine learning threat detector.

According to some examples, the executable instructions, upon execution by the processing unit, are configured to cause the processing unit to: perform a cybersecurity mitigation action based on the predicted threat level.

According to an aspect, there is provided a computer-readable storage device comprising instructions executable by a processor for: receiving at least one signal record comprising a first entity identifier and a signal identifier; generating an entity record for the first entity identifier, the entity record for the first entity identifier comprising a signal indicator for each unique signal identifier in a plurality of signal identifiers, the signal indicator indicating whether the unique signal identifier was associated with the first entity identifier in the at least one signal record; extracting, from the entity record for the first entity identifier; a signal feature vector; assigning a predicted threat level to the signal feature vector using a machine learning threat detector.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

What is claimed is:

1. A computer-implemented method comprising:
receiving a plurality of signal records, each signal record comprising an entity identifier, a signal identifier and a timestamp;
generating, using the timestamp of each signal record, an entity record for each unique entity identifier observed in the plurality of signal records during a predefined signal observation time period, the entity record comprising:
the unique entity identifier, and
a signal indicator for each unique signal identifier observed in the plurality of signal records during the predefined signal observation time period, the signal indicator indicating whether the unique signal identifier was associated with the unique entity identifier in the predefined signal observation time period;
assigning to each entity record, based on the unique entity identifier of the entity record, a threat label indicating whether the unique entity identifier of the entity record was associated with a detected cyberthreat within a predefined outcome observation time period;
extracting a signal feature vector corresponding to each entity record;
associating each signal feature vector with the threat label of the entity record to which the signal feature vector corresponds; and
generating a machine learning threat detector by training a machine learning model based on each signal feature vector and the threat label assigned to each signal feature vector, and configuring the machine learning threat detector to use the machine learning model.

2. A method according to claim 1, comprising:
receiving an unlabelled signal feature vector;
assigning a predicted threat level to the unlabelled signal feature vector using the machine learning threat detector;
performing a cybersecurity mitigation action based on the predicted threat level.

3. A method according to claim 2, wherein the unlabelled signal feature vector comprises an entity identifier, and wherein the predicted threat level comprises a probability that an entity identified by the entity identifier is malicious.

4. A method according to claim 2, wherein the unlabelled signal feature vector is for a first entity, and wherein the method comprises:
receiving at least one signal record for the first entity, each of the at least one signal record for the first entity comprising a signal identifier;
determining, for the first entity, an entity record comprising a signal indicator for each unique signal identifier observed in the plurality of signal records during the predefined signal observation time period, the signal indicator indicating whether the unique signal identifier was associated with the first entity in the at least one signal record for the first entity;
determining the unlabelled signal feature vector using the entity record for the first entity.

5. A method according to claim 1, wherein the machine learning threat detector comprises a tree-based classifier.

6. A method according to claim 1, wherein the machine learning threat detector comprises an Extreme Gradient Boosting (XGB) classifier.

7. A method according to claim 1, the method comprising:
receiving a second plurality of signal records, each signal record comprising an entity identifier, a signal identifier and a timestamp;
generating, using the timestamp of each signal record of the second plurality of signal records, an entity record for each unique entity identifier observed in the second plurality of signal records during a second predefined signal observation time period, the entity record comprising:
the unique entity identifier, and
a signal indicator for each unique signal identifier observed in the second plurality of signal records during the second predefined signal observation time period, the signal indicator indicating whether the unique signal identifier was associated with the unique entity identifier in the predefined signal observation time period;
assigning to each entity record for the second plurality of records, based on the unique entity identifier of the entity record, a threat label indicating whether the unique entity identifier of the entity record was associated with a detected cyberthreat within a second predefined outcome observation time period;
extracting a signal feature vector corresponding to each entity record for the second plurality of records;
associating each signal feature vector with the threat label of the entity record to which the signal feature vector corresponds; and
training a second machine learning threat detector based on each signal feature vector for the second plurality of records and the threat label assigned to each signal feature vector for the second plurality of records.

8. A method according to claim 1, wherein a first threat label of the threat label for the entity record for each unique entity identifier comprises an explicit label provided by a user, and wherein a second threat label of the threat label for the entity record for each unique entity identifier comprises an implicit label determined by an entity being involved in a malicious incident.

9. A method according to claim 1, wherein the signal indicator indicating whether the unique signal identifier was associated with the unique entity identifier in the predefined signal observation time period comprises an indication of a frequency of occurrence of association between the unique signal identifier and the unique entity identifier in the predefined signal observation time period.

10. A computer device comprising:
a processing unit;
a memory coupled to the processing unit and configured to store executable instructions which, upon execution by the processing unit, are configured to cause the processing unit to:
receive a plurality of signal records, each signal record comprising an entity identifier, a signal identifier and a timestamp;
generate, using the timestamp of each signal record, an entity record for each unique entity identifier observed in the plurality of signal records during a predefined signal observation time period, the entity record comprising:
the unique entity identifier, and
a signal indicator for each unique signal identifier observed in the plurality of signal records during the predefined signal observation time period, the signal indicator indicating whether the unique signal identifier was associated with the unique entity identifier in the predefined signal observation time period;
assign to each entity record, based on the unique entity identifier of the entity record, a threat label indicating whether the unique entity identifier of the entity record was associated with a detected cyberthreat within a predefined outcome observation time period;
extract a signal feature vector corresponding to each entity record;
associate each signal feature vector with the threat label of the entity record to which the signal feature vector corresponds; and
generate a machine learning threat detector by training a machine learning model based on each signal feature vector and the threat label assigned to each signal feature vector, and configure the machine learning threat detector to use the machine learning model.

11. A computer device according to claim 10, wherein the executable instructions, upon execution by the processing unit, are configured to cause the processing unit to:
receive an unlabelled signal feature vector;
assign a predicted threat level to the unlabelled signal feature vector using the machine learning threat detector;
perform a cybersecurity mitigation action based on the predicted threat level.

12. A computer device according to claim 10, wherein the unlabelled signal feature vector comprises an entity identifier, and wherein the predicted threat level comprises a probability that an entity identified by the entity identifier is malicious.

13. A computer device according to claim 10, wherein the machine learning threat detector comprises a tree-based classifier.

14. A computer device according to claim 10, wherein the machine learning threat detector comprises an Extreme Gradient Boosting (XGB) classifier.

15. A computer device according to claim 10, wherein the instructions cause the processing unit to:
receiving a second plurality of signal records, each signal record comprising an entity identifier, a signal identifier and a timestamp;
generating, using the timestamp of each signal record of the second plurality of signal records, an entity record for each unique entity identifier observed in the second plurality of signal records during a second predefined signal observation time period, the entity record comprising:
the unique entity identifier, and
a signal indicator for each unique signal identifier observed in the second plurality of signal records during the second predefined signal observation time period, the signal indicator indicating whether the unique signal identifier was associated with the unique entity identifier in the predefined signal observation time period;
assigning to each entity record for the second plurality of records, based on the unique entity identifier of the entity record, a threat label indicating whether the unique entity identifier of the entity record was associated with a detected cyberthreat within a second predefined outcome observation time period;
extracting a signal feature vector corresponding to each entity record for the second plurality of records;
associating each signal feature vector with the threat label of the entity record to which the signal feature vector corresponds; and
training a second machine learning threat detector based on each signal feature vector for the second plurality of records and the threat label assigned to each signal feature vector for the second plurality of records.

16. A computer device according to claim 10, wherein a first threat label of the threat label for the entity record for each unique entity identifier comprises an explicit label provided by a user, and wherein a second threat label of the threat label for the entity record for each unique entity identifier comprises an implicit label determined by an entity being involved in a malicious incident.

17. A computer device according to claim 10, wherein the signal indicator indicating whether the unique signal identifier was associated with the unique entity identifier in the predefined signal observation time period comprises an indication of a frequency of occurrence of association between the unique signal identifier and the unique entity identifier in the predefined signal observation time period.

18. A computer-implemented method comprising:
receiving at least one signal record comprising a first entity identifier and a signal identifier;
generating an entity record for the first entity identifier, the entity record for the first entity identifier comprising a signal indicator for each unique signal identifier in a plurality of signal identifiers, the signal indicator indicating whether the unique signal identifier was associated with the first entity identifier in the at least one signal record;
extracting, from the entity record for the first entity identifier, a signal feature vector;
assigning a predicted threat level to the signal feature vector using a machine learning threat detector; and
performing a cybersecurity mitigation action based on the predicted threat level.

19. A method according to claim 18, wherein the method comprises:
receiving a plurality of signal records comprising the at least one signal record, each signal record of the plurality of signal records comprising an entity identifier, a signal identifier and a timestamp;
generating, using the timestamp of each signal record, an entity record for each unique entity identifier observed in the plurality of signal records during a predefined signal observation time period, the entity record comprising:

the unique entity identifier, and a signal indicator for each unique signal identifier observed in the plurality of signal records during the predefined signal observation time period, the signal indicator indicating whether the unique signal identifier was associated with the unique entity identifier in the predefined signal observation time period;

assigning to each entity record, based on the unique entity identifier of the entity record, a threat label indicating whether the unique entity identifier of the entity record was associated with a detected cyberthreat within a predefined outcome observation time period;

extracting a signal feature vector corresponding to each entity record;

associating each signal feature vector with the threat label of the entity record to which the signal feature vector corresponds; and training a second machine learning threat detector based on each signal feature vector and the threat label assigned to each signal feature vector.

20. A method according to claim 18, wherein the machine learning threat detector comprises a tree-based classifier and the second machine learning threat detector comprises a tree-based classifier.

* * * * *